(12) United States Patent
Wu et al.

(10) Patent No.: US 11,487,986 B2
(45) Date of Patent: Nov. 1, 2022

(54) PROVIDING A RESPONSE IN A SESSION

(71) Applicant: Microsoft Technology Licensing, LLC, Redmond, WA (US)

(72) Inventors: Xianchao Wu, Tokyo (JP); Ander Martinez, Nara (JP); Hang Tong, Tokyo (JP)

(73) Assignee: Microsoft Technology Licensing, LLC, Redmond, WA (US)

(*) Notice: Subject to any disclaimer, the term of this patent is extended or adjusted under 35 U.S.C. 154(b) by 311 days.

(21) Appl. No.: 16/642,819

(22) PCT Filed: Oct. 13, 2017

(86) PCT No.: PCT/CN2017/106152
§ 371 (c)(1),
(2) Date: Feb. 27, 2020

(87) PCT Pub. No.: WO2019/071599
PCT Pub. Date: Apr. 18, 2019

(65) Prior Publication Data
US 2020/0202194 A1 Jun. 25, 2020

(51) Int. Cl.
*G06N 3/00* (2006.01)
*G06N 20/00* (2019.01)
(Continued)

(52) U.S. Cl.
CPC ....... *G06N 3/004* (2013.01); *G06F 16/24575* (2019.01); *G06N 5/02* (2013.01); *G06N 20/00* (2019.01)

(58) Field of Classification Search
CPC ........... G06F 16/24575; G06F 16/3329; G06F 40/211; G06F 40/295; G06F 40/35;
(Continued)

(56) References Cited

U.S. PATENT DOCUMENTS 9,786,299 B2 * 10/2017 Un .................... G06F 16/90332
10,594,757 B1 * 3/2020 Shevchenko ........... G06F 40/20
(Continued)

FOREIGN PATENT DOCUMENTS

| CN | 1419686 A | 5/2003 |
|---|---|---|
| CN | 1637740 A | 7/2005 |

(Continued)

OTHER PUBLICATIONS

"International Search Report and Written Opinion Issued in PCT Application No. PCT/CN17/106152", dated May 29, 2018, 9 Pages.
(Continued)

*Primary Examiner* — Kashif Siddiqui
(74) *Attorney, Agent, or Firm* — Schwegman Lundberg & Woessner, P.A.

(57) ABSTRACT

The present disclosure provides method and apparatus for providing a response to a user in a question-answering session. A message may be received in the session, the session being between the user and an electronic conversational agent. Context information is extracted from a context database based at least on the message. Fact information and emotion information are obtained from at least one of the message and the context information. The fact information is associated with at least one fact, and the emotion information is associated with emotions towards the at least one fact. A response is generated based at least on the fact information and the emotion information. The response is provided to the user.

18 Claims, 13 Drawing Sheets

(51) Int. Cl.
*G06F 16/2457* (2019.01)
*G06N 5/02* (2006.01)

(58) Field of Classification Search
CPC ........ G06F 40/44; G06N 20/00; G06N 3/004; G06N 5/02
See application file for complete search history.

(56) References Cited

U.S. PATENT DOCUMENTS

| | | | | |
|---|---|---|---|---|
| 2008/0096533 | A1* | 4/2008 | Manfredi | G06N 3/006 455/412.1 |
| 2014/0046876 | A1* | 2/2014 | Zhang | G06F 40/30 706/11 |
| 2016/0110422 | A1* | 4/2016 | Roytman | H04M 7/00 706/12 |
| 2016/0163332 | A1* | 6/2016 | Un | G10L 13/08 704/260 |
| 2018/0150739 | A1* | 5/2018 | Wu | G06N 20/10 |
| 2019/0089656 | A1* | 3/2019 | Johnson, Jr. | G10L 25/63 |

FOREIGN PATENT DOCUMENTS

| | | |
|---|---|---|
| CN | 101075435 A | 11/2007 |
| CN | 101246687 A | 8/2008 |
| CN | 106934452 A | 7/2017 |
| WO | 2017112496 A1 | 6/2017 |

OTHER PUBLICATIONS

"Second Office Action and Search Report Issued in Chinese Patent Application No. 201780081598.3", dated May 6, 2021, 11 Pages.
"First Office Action and Search Report Issued in Chinese Patent Application No. 201780081598.3", dated Aug. 28, 2020, 18 Pages.
"Third Office Action Issued in Chinese Patent Application No. 201780081598.3", (w/ English Translation), dated Nov. 3, 2021, 14 Pages.
"Extended European Search Report Issued in European Patent Application No. 17928752.9", dated Mar. 5, 2021, 07 Pages.
"Office Action Issued in European Patent Application No. 17928752.9", dated Jul. 14, 2022, 6 Pages.

* cited by examiner

PROVIDING A RESPONSE IN A SESSION

CROSS-REFERENCE TO RELATED APPLICATION

This application is a U.S. National Stage Filing under 35 U.S.C. 371 of International Patent Application Serial No. PCT/CN2017/106152, filed Oct. 13, 2017, and published as WO 2019/071599 A1 on Apr. 18, 2019, which application and publication are incorporated herein by reference in their entirety.

BACKGROUND

Artificial Intelligence (AI) chatbot is becoming more and more popular, and is being applied in an increasing number of scenarios. The chatbot is designed to simulate people's conversation, and may chat with users by text, speech, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for providing a response to a user in a question-answering session. A message may be received in the session, the session being between the user and an electronic conversational agent. Context information is extracted from a context database based at least on the message. Fact information and emotion information are obtained from at least one of the message and the context information. The fact information is associated with at least one fact, and the emotion information is associated with emotions towards the at least one fact. A response is generated based at least on the fact information and the emotion information. The response is provided to the user.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Conversational AI chat system is tending to be one of the most impressive directions in AI field in recent years. Conversation, through voice and/or text, is rediscovered as a unified entrance to many products or applications. For example, e-commerce online shopping customizes general chatbots to fit individual shops for clothes, shoes, cameras, cosmetics, etc., and supply online and in-time conversation-style consumer services. However, there remains challenge in the conversational AI chat system to automatically prepare responses during open-domain free chatting given a conversational context, since questions from users during the chatting are open and not limited to some pre-defined patterns.

Embodiments of the present disclosure propose a reasoning model that may automatically provide, in a question-answering session, an emotional response for a message from a user based on related context information. The question-answering session may refer to a time-continuous dialog between two chatting participants, which directs for answering questions from a user by a chatbot, and may include messages and responses in the dialog. Herein "message" refers to any information inputted by the user, e.g., queries/questions from the user, answers of the user to questions from the chatbot, documents indicated by the user, opinions of the user, etc., and "response" refers to any information provided by the chatbot, e.g., answers of the chatbot to questions from the user, comments of the chatbot, etc. The term "message" and the term "query" may also be interchangeably used.

Emotional responses may be generated based at least on the current query, context information in consideration of the user's personalized emotions towards topics. For example, in a scenario of conversation between a user and a chatbot, the reasoning model may embed context information into a dense vector space and reason several times, e.g., perform multi-round reasoning, based on the context information to infer new clues, in order to provide an emotional response to the current query. Every time the reasoning process is performed, the reasoning model may infer some new clues that can be appended to the current query, to limit the response range or to further use in a next reasoning round. For example, through such multiple-round conversation, the user's questions may be answered in an emotional way. This type of automated chatting service is more user-friendly compared with the traditional single-round question-answering services that are based on search engines.

Figure 1:
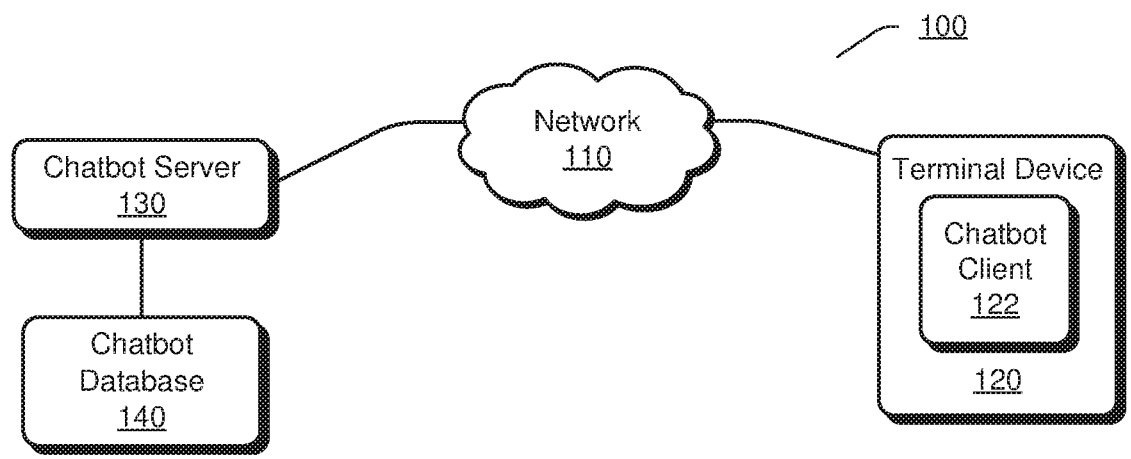
FIG. 1 illustrates an exemplary network architecture deploying a chatbot according to an embodiment.

FIG. 1 illustrates an exemplary network architecture 100 deploying a chatbot according to an embodiment.

In FIG. 1, a network 110 is applied for interconnecting among a terminal device 120 and a chatbot server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, AI terminals, etc. Although only one terminal device is shown in FIG. 1, it should be appreciated that a different number of terminal devices may connect to the network 110.

In an implementation, the terminal device 120 may be used by a user. The terminal device 120 may include a chatbot client 122 which may provide automated chatting service for the user. In some cases, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other cases, instead of interacting with the chatbot server 130, the chatbot client 122 may also locally generate responses to messages inputted by the user.

The chatbot server 130 may connect to or incorporate a chatbot database 140. The chatbot database 140 may comprise information that can be used by the chatbot server 130 for generating responses.

It should be appreciated that all the network entities shown in FIG. 1 are exemplary, and depending on specific application requirements, any other network entities may be involved in the application scenario 100.

Figure 2:
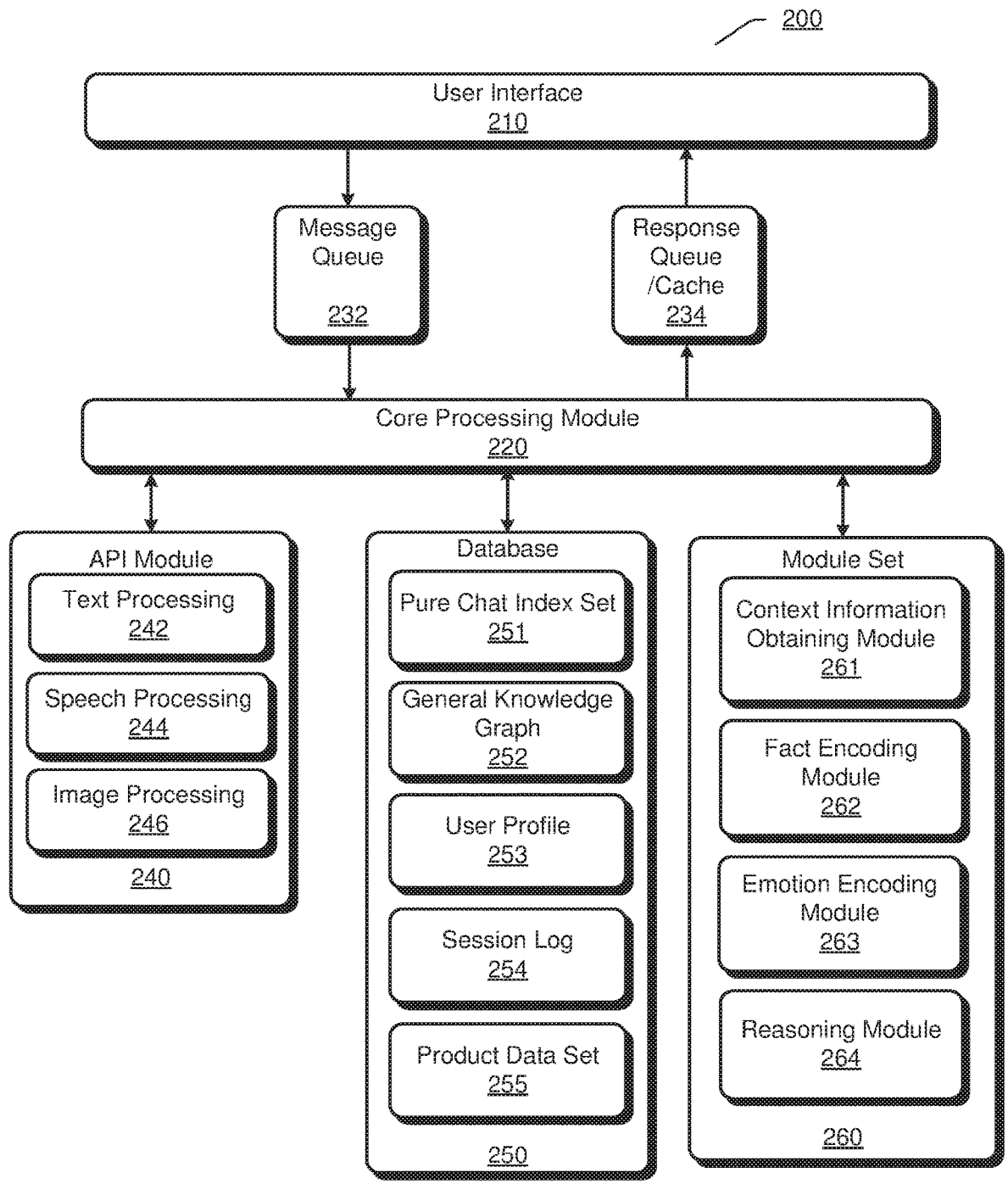
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The chatbot system 200 may obtain messages inputted by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through a database 250. The database 250 may comprise a plurality of index items that can be retrieved by the core processing module 220 for determining responses.

The database 250 may comprise a pure chat index set 251. The pure chat index set 251 may comprise index items that are prepared for free chatting between the chatbot and users, and may be established with data from, e.g., social networks. The index items in the pure chat index set 251 may or may not be in a form of question-answer (QA) pair, e.g., <question, answer>. Question-answer pair may also be referred to as message-response pair.

The database 250 may comprise a general knowledge graph 252. Herein, the general knowledge graph 252 may refer to a single knowledge graph or a plurality of knowledge graphs in various domains. The general knowledge graph 252 may be established from websites on the network, such as, Wikipedia, Baidu Baike, Hudong Baike, and so on. Knowledge information in the general knowledge graph 252 may be in a form of tuple.

The database 250 may comprise a user profile 253. The user profile 253 may comprise personalized information of a user. For example, the user profile 253 may comprise the user's gender, age, location information, interested topics, emotions towards the interested topics, etc.

The database 250 may comprise a session log 254. The session log 254 may comprise records of conversation contents in sessions between the chatbot and the user, such as, messages from the user, responses by the chatbot, etc.

The database 250 may comprise a product data set 255. The product data set 255 may comprise various types of product information from various partner entities. Herein, "product" may refer to commodities or services, the partner entities may be producers or sellers of commodities or providers of services from which the chatbot may obtain product information, and "product information" may include commodity information, service information, information of partner entity, etc. In an implementation, the product information in the product data set 255 may comprise documents related to products to be recommended to users.

The chatbot system 200 may comprise a module set 260 which is a collection of functional modules that may be operated by the core processing module 220 to generate or obtain responses.

The module set 260 may comprise a context information obtaining module 261 that may be configured for obtaining context information. Herein, "context information" may refer to, such as, documents indicated by the user, documents related to products from partner entities, session log, etc. In some cases, the user may upload or mention a document in a session with the chatbot, and thus the context information obtaining module 261 may obtain the document, as context information, from the session, from the network or from a pre-established database, wherein the document may be various plain text style documents, such as, articles, news, books, etc. In some cases, a product may be involved in a session between the chatbot and the user, and thus the document obtaining module 261 may obtain a document related to the product, as context information, from corresponding partner entities, wherein the document may be textual description of the product, etc. In some cases, the document obtaining module 261 may directly utilize a session log that is maintained for the user as context information. It should be appreciated that a context database may be applied to maintain various context information as discussed above, and thus the context information obtaining module 261 may retrieve context information from the context database. Although not shown, the context database may also be incorporated into the database 250.

The module set 260 may comprise a fact encoding module 262. The fact encoding module 262 may be configured for encoding the context information and/or the current query by using, such as, a Bidirectional Recurrent Neural Network (BiRNN), to generate fact vectors.

The module set 260 may comprise an emotion encoding module 263. The emotion encoding module 263 may be configured for encoding the context information and/or the current query by using, such as, a BiRNN together with a SoftMax layer, to generate emotion vectors.

The module set 260 may comprise a reasoning module 264. The reasoning module 264 may be configured for reasoning out a response to the user's current query through a reasoning network, wherein the response may provide meaningful information while being empathic with the user's personalities. In some cases, "meaningful information" may indicate information that are reasoned through the reasoning network based at least on, such as, the current query, context information, external general knowledge, etc. The external general knowledge may be, such as, general knowledge graph.

The core processing module 220 may provide the generated responses to a response queue or response cache 234. For example, the response cache 234 may ensure that a sequence of responses can be displayed in a pre-defined time stream. Assuming that, for a message, there are no less than two responses generated by the core processing module 220, then a time-delay setting for the responses may be necessary. For example, if a message inputted by the user is "Did you eat your breakfast?", two responses may be generated, such as, a first response "Yes, I ate bread" and a second response "How about you? Still feeling hungry?". In this case, through the response cache 234, the chatbot may ensure that the first response is provided to the user immediately. Further, the chatbot may ensure that the second response is provided in a time delay, such as 1 or 2 seconds, so that the second response will be provided to the user 1 or 2 seconds after the first response. As such, the response cache 234 may manage the to-be-sent responses and appropriate timing for each response.

The responses in the response queue or response cache 234 may be further transferred to the UI 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
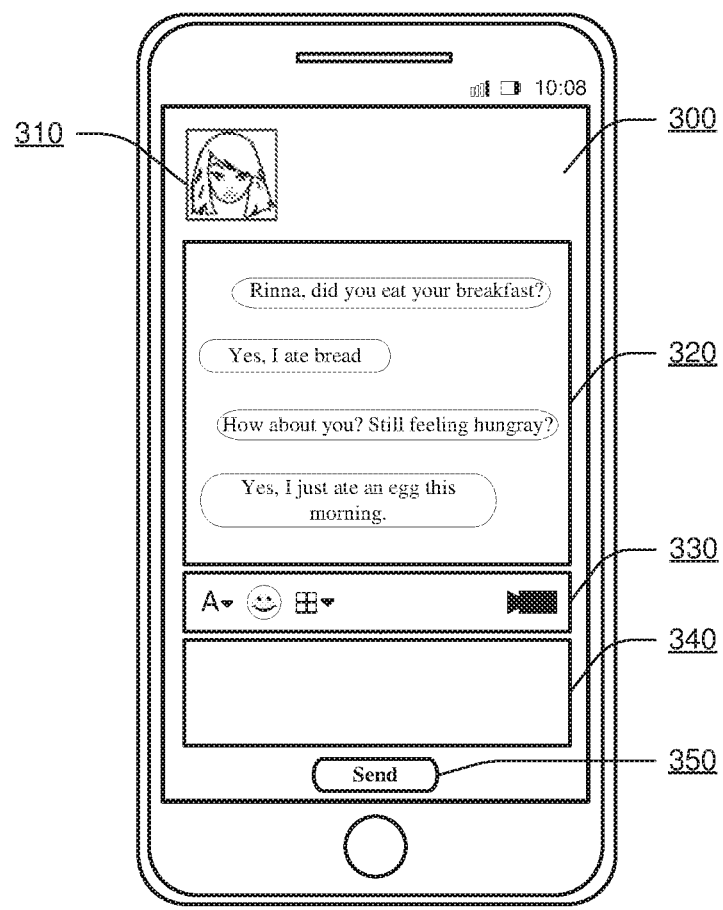
FIG. 3 illustrates an exemplary user interface according to an embodiment.

FIG. 3 illustrates an exemplary user interface 300 according to an embodiment.

The user interface 300 may be included in a terminal device, and may comprise a chatbot icon 310, a presentation area 320, a control area 330 and an input area 340. The chatbot icon 310 may be a photo or picture representing the chatbot, such as, logo, name and homepage URL of the chatbot. The presentation area 320 may display a chat window that may contain messages and responses in a session between a user and the chatbot. The control area 330 may include a plurality of virtual buttons for the user to perform message input settings. For example, the user may select to make a voice input, attach image files, select emoji symbols, make a short-cut of the current screen, activate camera, make a voice call or video conversation with the chatbot, etc. through the control area 330. The input area 340 may be used by the user for inputting messages. For example, the user may type text through the input area 340. The user interface 300 may further comprise a virtual button 350 for confirming to send the inputted messages. If the user touches the virtual button 350, the messages inputted in the input area 340 may be sent to the presentation area 320.

It should be appreciated that all the elements and their layout shown in FIG. 3 are exemplary. Depending on specific application requirements, the user interface in FIG. 3 may omit or add any elements, and the layout of the elements in the user interface in FIG. 3 may also be changed in various approaches. For example, although the messages and responses are shown in a form of text in the presentation area 320, the messages and responses may also be in a form of speech. Accordingly, the chatbot and the user may chat by voices.

Figure 4A:
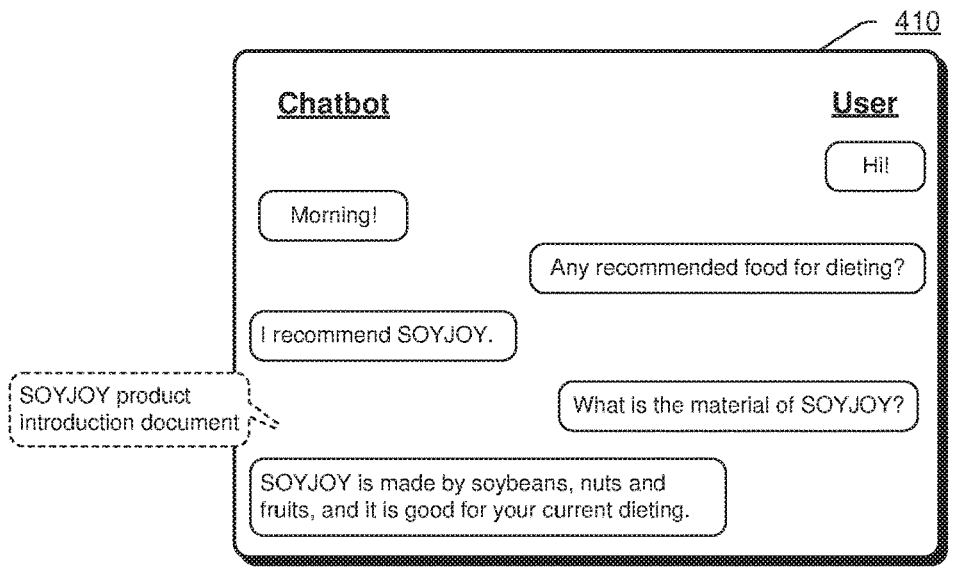
FIG. 4A-FIG. 4C illustrate exemplary chat windows between a user and a chatbot according to embodiments.

FIG. 4A illustrates an exemplary chat window 410 according to an embodiment. The chat window 410 shows an exemplary procedure for providing an emotional response by the chatbot to the user based at least on a document obtained from a partner entity.

When receiving a message "Hi!" from the user in a session, the chatbot may give a response "Morning!" based on a pure chat index set.

When receiving a message "Any recommended food for dieting?" in the session, the chatbot may use various product recommendation approaches to determine that a product "SOYJOY" is suitable for the user. Accordingly, the chatbot may recommend SOYJOY to the user.

The user may further input a message "What is the material of SOYJOY?". When receiving such a question in the message, the chatbot may extract context information from a context database based on the message. For example, the chatbot may extract a SOYJOY product introduction document provided by a producer of SOYJOY from the context database, wherein the document may include material information of SOYJOY. According to at least one of the message from the user, the SOYJOY product introduction document and the previous session log between the user and the chatbot, the chatbot may determine, through a reasoning network, an answer to the user's question "SOYJOY is made by soybeans, nuts and fruits" together with an emotional expression "it's good for your current dieting", wherein the emotional expression is related to a topic of "dieting" that is previously mentioned in the session.

Figure 4B:
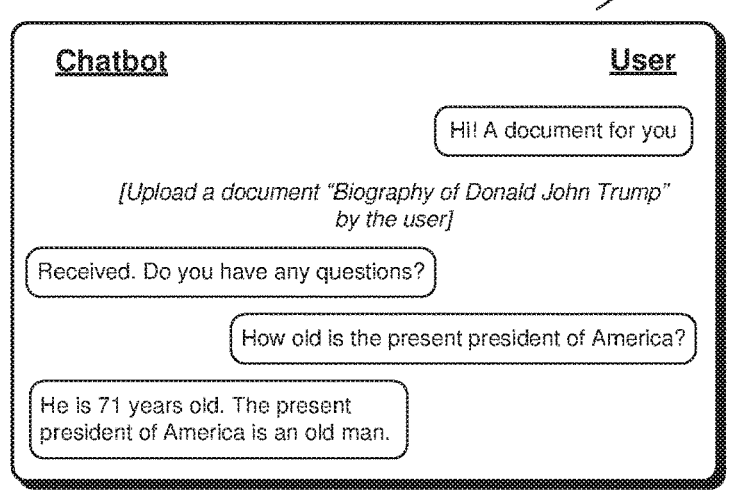

FIG. 4B illustrates an exemplary chat window 420 according to an embodiment. The chat window 420 shows an exemplary procedure for providing an emotional response by the chatbot to the user based at least on a document provided by the user.

After sending a message "Hi! A document for you", the user may upload a document "Biography of Donald John Trump" in the chat window 420. The chatbot may store the document in a context database and respond by "Received. Do you have any questions?".

When receiving a question "How old is the present president of America?" in a message from the user, the chatbot may search in the document stored in the context database to see whether there is recited any information about "president of America" and/or ages in the document. For example, if it is recited in the document that the present president of America is Donald John Trump and Donald John Trump was "born in 1946", then the chatbot may determine from the document that the present president of America is 71 years old. As another example, if information recited in the document is not sufficient to answer the user's question, then the chatbot may obtain further information from external general knowledge, e.g., from a general knowledge graph or from websites like Bing, Google, Baidu, etc., to extend the message as "the present president of America is Donald John Trump, and how old is Donald John Trump" and further determine that Donald John Trump is 71 years old based at least on the document and/or the external general knowledge. The chatbot may use a reasoning network to derive an emotional response to the message. As an example, if the chatbot finds, based at least on context information in the context database and the received message, that the user shows no specific emotion towards Donald John Trump, then the chatbot may generate a response "He is 71 years old. The present president of America is an old man", wherein the sentence "The present president of America is an old man" has a neutral emotion. It should be appreciated that, as another example, if the user shows a "disgust" emotion towards Donald John Trump in a session log, the chatbot may also generate a response such as "He is 71 years old. The present president of America is too old".

In some cases, the user may not ask any question after uploading the document. In such cases, the chatbot may ask the user to input a question. If there is still no question inputted by the user, then the chatbot may return nothing or some predetermined messages like "I cannot provide response since no question/query is specified". Alternatively, the chatbot may initiatively propose a question, e.g., "Do you want to know how old is the present president of America?" to the user based at least on the document and/or a session log, to determine whether the user wants to ask this question.

Figure 4C:
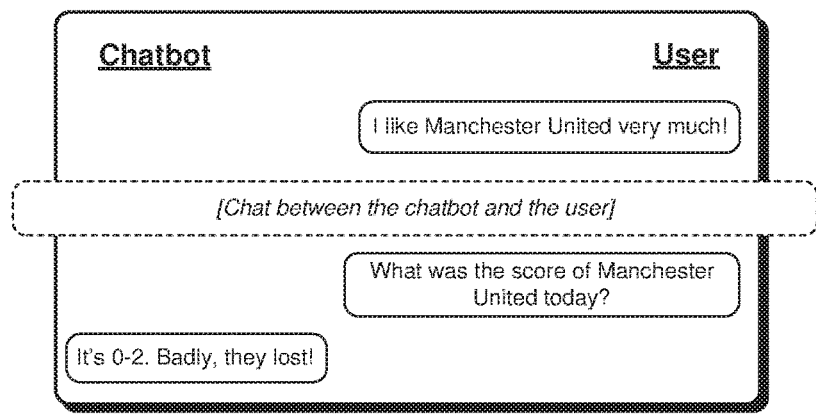

FIG. 4C illustrates an exemplary chat window 430 according to an embodiment. The chat window 430 shows an exemplary procedure for providing an emotional response by the chatbot to the user based at least on a session log of the user.

In the chat window 430, the user may express that he likes Manchester United very much, wherein Manchester United is a famous football team. Then the user may have a chat with the chatbot on football topic.

When receiving a message "What was the score of Manchester United today?" from the user, the chatbot may find an answer "0-2" from the network. Meanwhile, the chatbot already knows that the user likes Manchester United from the previous conversation in the session log. Then the chatbot may utilize a reasoning network to generate a response "It's 0-2. Badly, they lost!", wherein the sentence "Badly, they lost!" shows a "sadness" emotion which may reflect the current mood of the user.

It should be appreciated that the above discussed examples in FIG. 4A-FIG. 4C for providing emotional responses are illustrative, and there may be any other chatting scenarios according to the embodiments of the present disclosure.

Figure 5:
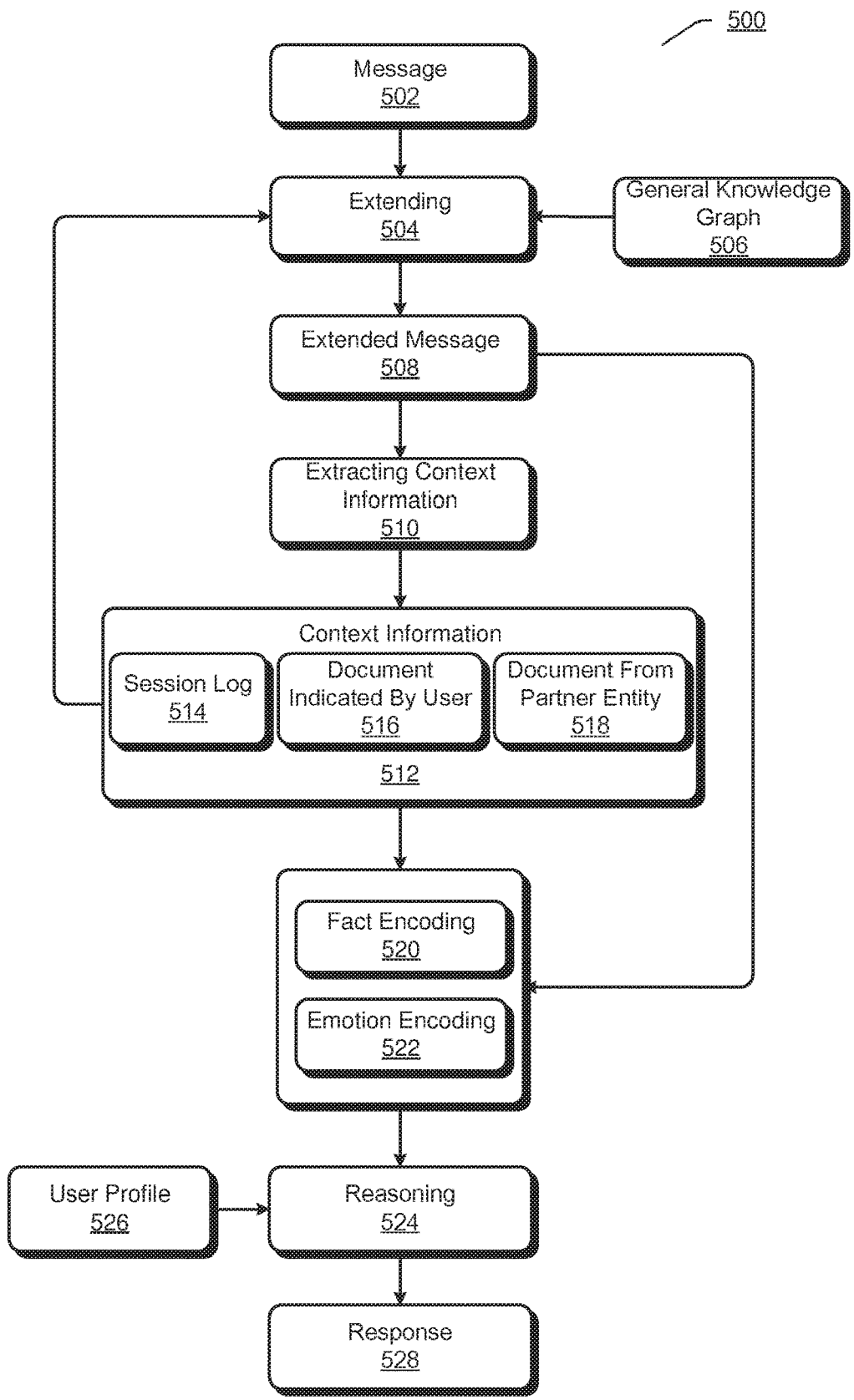
FIG. 5 illustrates an exemplary overall process for providing an emotional response according to an embodiment.

FIG. 5 illustrates an exemplary overall process 500 for providing an emotional response according to an embodiment. Through the process 500, an emotional response to a message inputted by the user may be generated through reasoning.

A message 502 may be received from the user. Herein, the message 502 may refer to one or more current or latest messages from the user. The message 502 may be in a form of text, speech, image, etc. Since a speech or image message may be converted to a corresponding text message, the following discussion will take text message as an example.

At 504, the message 502 may be extended. Through the extending operation at 504, implicit, omitted or additional information may be added into the message 502 such that the rewritten message may have a complete semantic expression. In an implementation, general knowledge graph 506 may be taken as input to the extending operation at 504. The general knowledge graph 506 may comprise general knowledge obtained from, such as, websites on the network. For example, if the user is querying in the message 502 that "How old is the present president of America?", the extending operation at 504 may identify a fact "present president of America" from the message. The extending operation at 504 may further retrieve an extended fact from the general knowledge graph based on the identified fact "present president of America", such as a piece of knowledge in the general knowledge graph 506 which shows that the present president of America is Donald John Trump. Thus, this message may be extended by rewriting as "How old is the present president of America—Donald John Trump?" based on the general knowledge graph 506.

Through the extending operation at 504, an extended message 508 may be obtained. As discussed above, the extended message 508 may be obtained through rewriting the message 502 by adding implicit, omitted or additional information. The extended message 508 may be further used in the following operations in the process 500. It should be appreciated that, in some implementations, the extending operation at 504 may also be omitted from the process 500, and thus the message 502, instead of the extended message 508, may be directly used in the following operations in the process 500.

At 510, context information 512 may be extracted from a context database based at least on the extended message.

In an implementation, the context information 512 may comprise a session log 514. The session log 514 may be stored in the context database. As shown in the exemplary chat window in FIG. 4C, the user may ask a question in the session, and thus the chatbot may extract the session log 514 from the context database, as the context information, to be used for generating a response.

In an implementation, the context information 512 may comprise a document 516 indicated by the user during the session. For example, the user may upload the document during the session, as shown in the exemplary chat window in FIG. 4B, or simply mention the name or source of the document during the session. The chatbot may obtain the document from the session or from the network, and store the document in the context database. In this case, when the user asks a question relating to the document in the extended message, the chatbot may extract the document from the context database, as the context information, to be used for generating a response.

In an implementation, the context information 512 may comprise a document 518 from a partner entity. This document may be associated with products that are to be recommended to users and provided by the partner entity. The document may be stored in the context database. As shown in the exemplary chat window in FIG. 4A, when the user asks a question relating to a product in the extended message, the chatbot may extract a corresponding product introduction document from the context database, as the context information, to be used for generating a response.

It should be appreciated that, in some implementations, the context information 512 may also be used in the extending operation at 504 for extending the message 502 in a similar way as the general knowledge graph. For example, if the session log 514 in the context information 512 indicates that the user is talking about a topic of Manchester United with the chatbot, and a message "I like this team" is received from the user, then this message may be extended as "I like this team—Manchester United" based on the session log 514. For example, if the document 516 indicated by the user in the context information 512 is "Biography of Donald John Trump" which recites Donald John Trump is the present president of America, and the user is querying in the message 502 that "How old is the present president of America?", then this message may be extended as "How old is the present president of America—Donald John Trump?" based on the document 516 indicated by the user. For example, if the document 518 from the partner entity in the context information 512 is a product introduction document about NIKE shoes provided by NIKE company, and the user is querying in the message 502 that "Is it a good idea to buy NIKE for running?", then this message may be extended as "Is it a good idea to buy NIKE shoes for running?" based on the document 518 from the partner entity.

When the context information 514 is extracted, the chatbot may apply fact encoding 520 and emotion encoding 522 on the context information 512, to obtain fact information and emotion information respectively. For example, fact vectors may be obtained for the context information 512 through the fact encoding 520, and emotion vectors may be obtained for the context information 512 through the emotion encoding 522. The fact information for the context information 512 may reflect factual contents in the context information 512. e.g., topics, keywords, etc., and the emotion information for the context information 512 may reflect emotions expressed in the context information 512, such as, positive, negative and neutral emotions. Especially, the emotions may be further classified as, such as, anger, contempt, disgust, fear, happiness, neutral, sadness, surprise, etc. Moreover, as shown in FIG. 5, the fact encoding 520 and the emotion encoding 522 may also be applied on the extended message 508 so as to obtain corresponding fact information and emotion information respectively, e.g., fact vectors and emotion vectors for the extended message.

At 524, a reasoning operation may be performed, based at least on the fact information and the emotion information obtained at 520 and 522, so as to generate a response 528. In an implementation, the reasoning operation at 524 may be a multi-round reasoning with an attention mechanism. In each round reasoning, an attention vector in the attention mechanism may be updated through recalculating the fact information and the emotion information. Through the reasoning operation at 524, the generated response 528 may be an emotional response.

In an implementation, a user profile 526 may also be taken as an input to the reasoning operation at 524. As discussed above, the user profile 526 may comprise the user's gender, age, location information, interested topics, emotions towards the interested topics, etc.

In one aspect, a user profile model may be used for predicting gender, age and location information from, such as, historical queries of the user. Training data for the user profile model may be manually created.

For a gender classification model, inputs may be <user id, queries> and outputs may be a tag of "male" or "female". A number of clues in the queries can be utilized, such as, "my wife does not do any family works" is likely spoken by a married man, "my husband is quite busy recently" is more frequently spoken by a married woman, etc.

For an age classification model, inputs may be <user id, queries> and outputs may be a tag of, e.g., "10+", "20+", "30+". "40+", "50+" or "60+", where "10+" indicates an age between 10 and 20, "20+" indicates an age between 20 and 30, "30+" indicates an age between 30 and 40, and so on. A number of clues can be utilized in the natural language queries. The age classification model may determine age information based on the queries. For example, if a user says "I am a senior middle school student" in a session, it may be determined that the age of the user is "10+". If a user says "I will possibly graduate next year, yet it's really difficult for job hunting" in a session, it may be determined that the age of the user is "20+." If a user says "Finally, I can drink alcohol now" in a session, then it may be determined that the age of the user is "20+" since, for example, the drinking age in Japan is 20 years old. If a user says "I am busy of working" in a session, it may be determined that the age of the user is "30+," "40+," or even "50+". If a user says "I am already retired, yet I am feeling lonely since I do not have a grand-child yet" in a session, it may be determined that the user is very likely to be "60+." Consequently, these types of information may be used to identify the age of users so that their concerned topics can be collected and filtered out in an automatic way.

For a location detection model, inputs may be <user id, queries> and outputs may be at least one tag of location, including a number of places, e.g., Tokyo, Kyoto, Hokkaido, etc. There are a number of clues which can be used for predication of locations. The location detection model may determine location information based on the queries. For example, if a user says "Shinkansen round-trip tickets from Tokyo to Kyoto" in a session, it may be determined that the user is living in Tokyo. If a user says "I am feeling tired every day, is there any place interesting around Ueno?" in a session, it may be determined that the user is active around Ueno in Tokyo.

The above three classification or detection models may be trained based on training data of <user id, queries, target tags>. Features for the training may comprise:

Query words, such as, target category or company of the query: for example, females may have stronger tendency to domains of cosmetics and their related companies, such as, SK-II, LANCOME and so on; yet for males, their interested topic words may be more related to golf, car, travel, sports, cheeses and so on.

Disease keywords included in the user's historical query: for example, man and woman may have gender-sensitive diseases, such as, mammary-related diseases for woman and prostate-related diseases for man.

List of location-related words that the user mentioned the most: an existing location lexicon may be used for detecting location-related words in the user's queries.

Word ngrams: unigrams and bigrams for words in the query.

Character ngrams: for each word in the query, character ngrams are extracted. For example, 4-grams and 5-grams are used in this model.

Word skip-grams: for all trigrams and 4-grams in the query, a word may be replaced by a symbol, such as, "*", to indicate presence of non-contiguous word.

Brown cluster ngrams: Brown clusters are used for representing words in the query, and then unigrams and bigrams are extracted as features.

Part-of-speech (POS) tags: the presence or absence of POS tags is used as binary features.

Social network related words: numbers of hashtags, emoticons, elongated words, and punctuations in the query are used as features.

Word2vec cluster ngrams: an existing word2vec tool may be used for learning 100-dimensional word embedding from a social network dataset. Then, K-means algorithm and L2 distance of word vectors may be applied to cluster million-level vocabulary into, such as, 200 classes. The classes are used for representing generalized words in the query.

A multiple-class support vector machine (SVM) model may be trained using the above exemplary features. These three models may share similar feature templates. It should be appreciated that the above discussed features for the SVM model are illustrative rather than limitative, and according to actual requirements, more or less features may be used by the SVM model.

Figure 6:
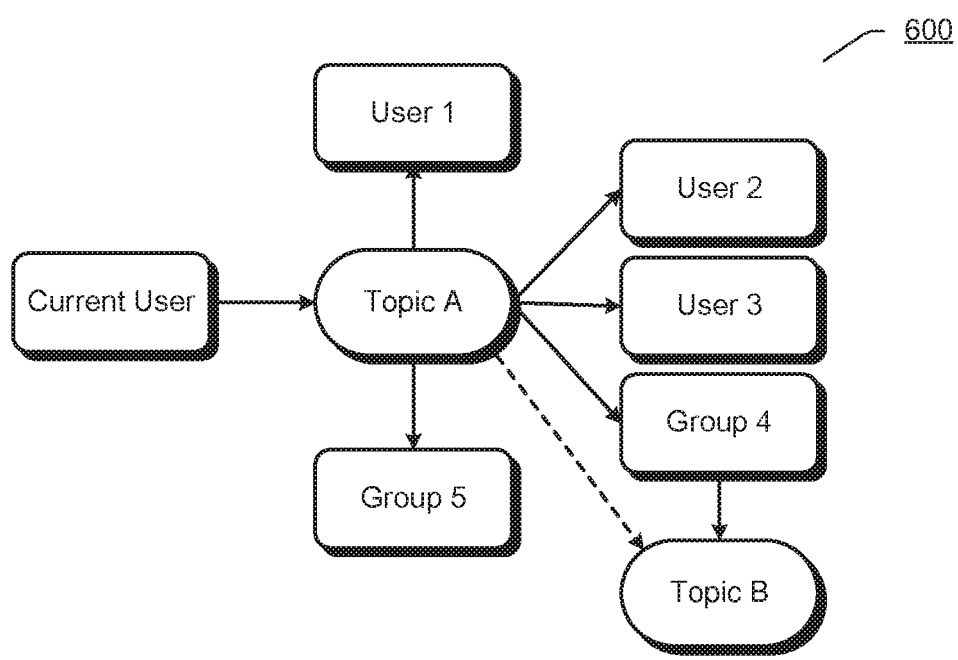
FIG. 6 illustrates an exemplary user-topic transferring model according to an embodiment.

In another aspect, interested topics and emotions towards the interested topics in the user profile 526 may be organized as a personalized knowledge graph. Knowledge information in the personalized knowledge graph may be represented in a tuple of <user, topic, emotion>. During establishing the personalized knowledge graph, a user-topic transferring model may be utilized. FIG. 6 illustrates an exemplary user-topic transferring model 600 according to an embodiment. The user-topic transferring model 600 may be used for user-topic detection and topic-topic connection.

In the case of user-topic detection, the model 600 may be applied in two scenarios, one is for individual users, and another is for group users.

As for the scenario of individual users: under this scenario, when a "Topic A" of the current user, such as one "event" or "preference", is collected and uploaded to the personalized knowledge graph, there is a "transfer" action that starts from the "node" of the current user to other users through the "Topic A". There may be an active signal sent from "Topic A" to other users, such as User 1 to Group 5. The target of this "transfer" action is to activate other users again in case that these users are not "active" to "Topic A" in a relatively long time. Consequent actions may be performed. One consequent action may comprise: proactively selecting a part of the users. User 1 to Group 5, and asking questions about whether he or she still has an opinion to "Topic A". For example, this proactive triggering of users can help updating the personalized knowledge graph and help constructing a relatively "fresh" personalized knowledge graph to be used for in-time new users/groups recommendation. Another consequent action may comprise: performing deep propagation from the selected users to their topics other than "Topic A", such as "Topic B". When "Topic A" and "Topic B" are linked by more and more users, then a similarity score between "Topic A" and "Topic B" may be updated to be higher. For example, assuming that "Topic A" is "Chihuahua" and "Topic B" is "Pomeranian", if more and more users share these two topics, then their "similarity" may be increased with a linear relevance with the number of users.

As for the scenario of group users: the model 600 may detect topics that are introduced by or involved with one user and keep track of other users' opinions/comments to these topics. Also, time point/period and location information may also be detected based on context information. The updating of the personalized knowledge graph for group users is similar with that for individual users.

Based on the above discussion, one type of output of the model 600 may be tuples of <user, topic>. Alternatively, this type of output may also be is the form of <user, topic, degree of interest, time, location>.

In the case of topic-topic connection, the model 600 may score relationship between every two topics, such as "Topic A" and "Topic B". Accordingly, another type of output of the model 600 may be tuples of <topic1, topic2> or <topic1, topic2, relation score>. Since each topic is associated with a number of users, through linking two topics, two groups of users may be further implicitly connected. The model 600 may improve "freshness" recommendation of new users/groups to an individual user of the chatbot. For example, the obtained tuples may be appended and/or proactively deleted to keep the personalized knowledge graph fresh.

After the tuples <user, topic> or <user, topic, degree of interest, time, location>, and the tuples <topic1, topic2> or <topic1, topic2, relation score> are obtained as discussed above, emotional weights may be attached to <user, topic> to construct a personalized knowledge graph of the current user in the form of <user, topic, emotion>.

In an implementation, for the current user, for a given topic keyword, all relevant queries of the current user may be collected and inputted to a sentiment analysis classifier to obtain a corresponding emotion distribution, wherein the emotion distribution may comprise emotion tags and probabilities attached to each emotion tag. Then, the emotion distributions may be attached to a current <user, topic> record to form a tuple of <user, topic, emotion>.

In an implementation, since the number or scope of topics mentioned by one user is quite limited, the tuples <topic1, topic2, relation score> or <topic1, topic2> may be used between each topic pairs to further extend an emotion towards one topic to another relevant topic. For example, if one user likes drinking "salad". e.g., having a positive emotion towards drinking "salad", then the topic "salad" may be extended to "salad juice" and a discounted probability with the same "positive" emotion may be assigned to the new topic "salad juice".

In an implementation, when two or more "similar" users, e.g., user A and user B, share common emotions towards a list of shared topics, a discounted probability with a similar emotion tag may be assigned to a topic that is linked with user A but not user B. When this action is performed, it may need to first find the "similar" users through:

$$\text{Similar.score(user } A, \text{user } B) = \Sigma^k = 0^n \Sigma_{i=0}{}^m \text{similar.score(topic.}k,\text{topic.}l) \quad \text{Equation (1)}$$

In this equation, n is the number of topics that are attached with user A, each topic being annotated by topic.k, and m is the number of topics that are attached with user B, each topic being annotated by topic.l. Similar score of two given topics, e.g., topic1 and topic2, are exactly the "relation score" extracted beforehand and included in the tuple <topic1, topic2, relation score>.

Figure 7:
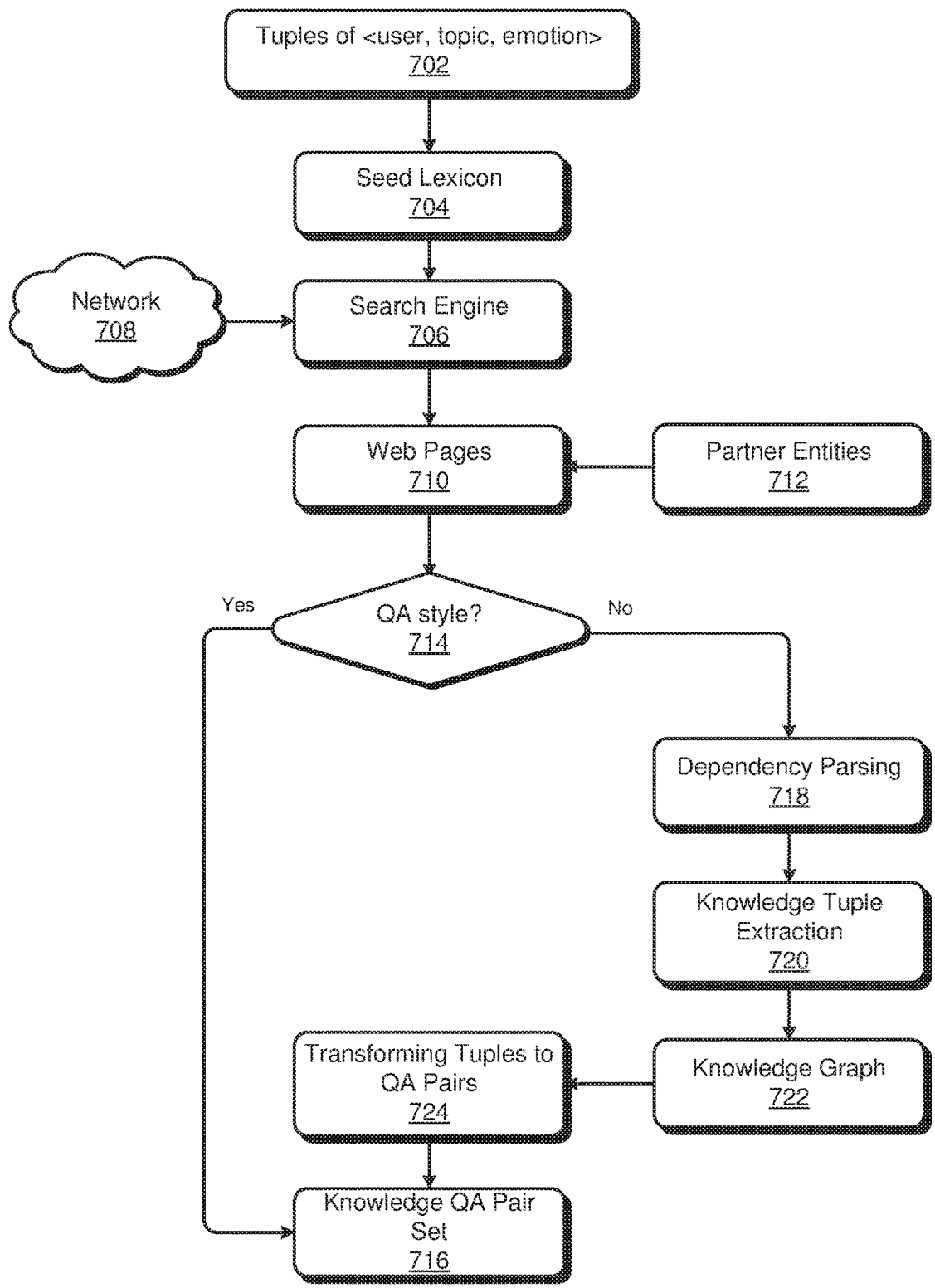
FIG. 7 illustrates an exemplary process for establishing general knowledge graph and knowledge question-answer (QA) pair set according to an embodiment.

FIG. 7 illustrates an exemplary process 700 for establishing general knowledge graph and knowledge QA pair set according to an embodiment.

When constructing general knowledge graph, there are usually several types of data to be inputted as knowledge information in the general knowledge graph. For example, one type of data may be a tuple of <entity, entity, relation> and another type of data may be a QA pair <question, answer>. There is a need to automatically change a tuple of <entity, entity, relation> into a number of natural language style QA pairs, since the final target of a reasoning network is to supply natural language style responses to the users' natural language style questions. The knowledge information in the general knowledge graph is an important appendence to the reasoning network, which can supply external knowledge during the reasoning process. The process 700 shows extracting tuple-style knowledge graph and transferring knowledge tuples into QA pairs.

Tuples of <user, topic, emotion> 702 may be used for obtaining a seed lexicon 704. The seed lexicon 704 may be further used for providing searching keywords for a search engine 706. It should be appreciated that any other types of lexicon may be used for providing searching keywords.

Each entry in the seed lexicon 704 may be provided to the search engine 706. The search engine 706 may crawl relevant web pages 710 from the network 708 by using the entry as a searching keyword. The resulted web pages are supposed to contain at least one seed, e.g., topic word included in the seed lexicon.

Additionally or alternatively, the web pages 710 may also be provided by partner entities 712. The partner entities 712 may be, such as, shops, medicine-makers, product providers, producers, sellers, restaurants, etc. that can supply the web pages 710 or related data, e.g., textual description or keywords of their products.

The web pages 710 may be classified into two types, one type is in a QA pair style and another type is in a plain text style. At 714, it may be determined whether a web page is in a QA pair style, such as, in a form of <question, answer>. If yes. QA pairs in the web page may be added into a knowledge QA pair set 716. If not, that is, the web page is in a form of plain text, dependency parsing may be performed on the plain text at 718. Syntactic structures of sentences in the plain text may be identified through dependency parsing at 718, and then knowledge tuples may be extracted from dependency trees of the sentences at 720. The knowledge tuples may further form a knowledge graph 722. At 724, the knowledge tuples from the knowledge graph may be transformed to QA pairs and then such QA pairs may be inputted to the knowledge QA pair set at 716.

Figure 8A:
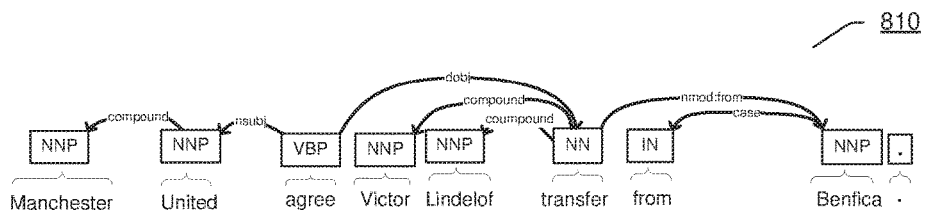
FIG. 8A-FIG. 8C illustrate exemplary dependency parsing according to an embodiment.
Figure 8B:
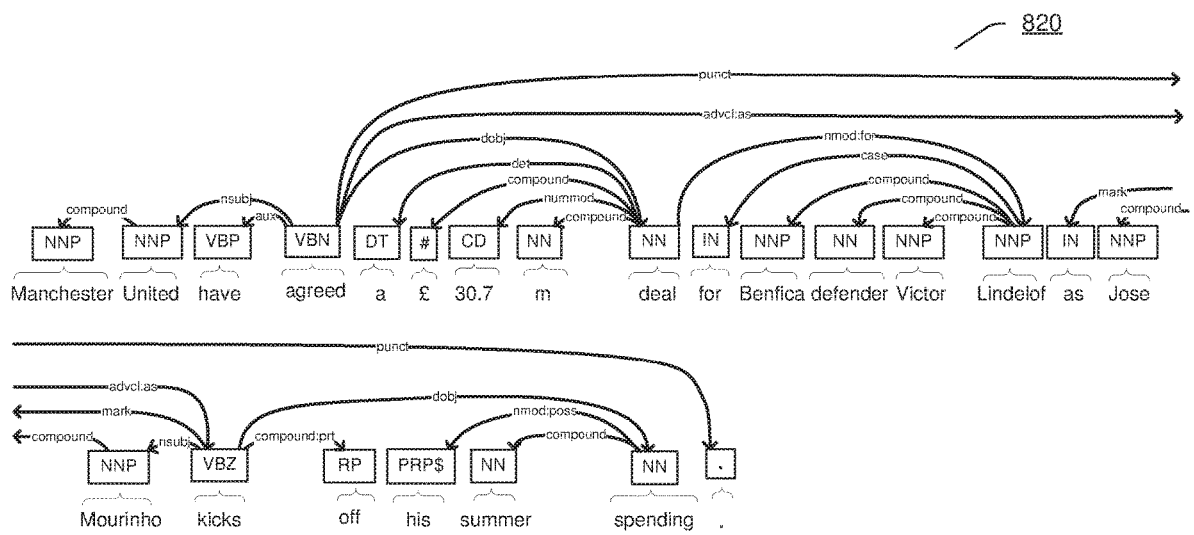

FIG. 8A and FIG. 8B illustrate exemplary dependency parsing to extract knowledge tuples from dependency trees of sentences according to an embodiment. FIG. 8A illustrates an exemplary dependency parsing 810 on a sentence "Manchester United agree Victor Lindelof transfer from Benfica.", and FIG. 8B illustrates an exemplary dependency parsing 820 on a sentence "Manchester United have agreed a £30.7m deal for Benfica defender Victor Lindelof as Jose Mourinho kicks off his summer spending.". Dependency trees are obtained through performing the dependency parsing 810 and 820 on the sentences. It should be appreciated that various dependency parsing techniques may be used here for performing the dependency parsing.

Knowledge tuples may be extracted from the dependency trees of the sentences. The extracting process may follow dependency arcs which link predicates with arguments and link entities with syntactic relations.

It is assumed that the seed lexicon 704 in FIG. 7 contains entities "Manchester United", "Victor Lindelof" and "Benfica". Then, the syntactic relations may be extracted among the entities in the sentences by the following dependency arcs shown in FIG. 8A and FIG. 8B: <Victor Lindelof. Benfica, transfer from/nmod:from>, where nmod stands for noun style modifier of the arc, indicating that "Benfica" modifies, in detail, the entity of "Victor Lindelof"; <Manchester United. Victor Lindelof, agree/nsubj–dobj>, where nsubj is a noun-style argument of the predicate "agree" and dobj is a direct object argument of the predicate "agree", and thus the two entities "Manchester United" and "Victor Lindelof" are linked together through the predicate word "agree"; and <Benfica defender, Victor Lindelof, compound>, where the compound is a dependency relation that links two noun phrases together as a compound phrase.

Exemplary knowledge tuples in a form of <entity, entity, relation> are shown above. Through this way, various available relationships for entities that appear in the plain text may be collected.

As shown in FIG. 7, the knowledge tuples in the knowledge graph 722 may be transformed to QA pairs at 724. Taking a tuple <Manchester United. Victor Lindelof, agree—transfer>as an example, this tuple describes the relation "agree—transfer" between an entity "Manchester United", which is a football team, and an entity "Victor Lindelof", which is a football player. This tuple may be transformed to the following QA pairs:

Question=Who does Manchester United agree transfer? Answer=Victor Lindelof.

Question=Does Manchester United agree transfer of Victor Lindelof?
Answer=Yes, it is.

Question=Which team agree Victor Lindelof transfer? Answer=Manchester United.

In this way, one tuple may be automatically transformed into a plurality of QA pairs in natural language. These natural language style QA pairs may be used for providing natural language style responses to the user. The QA pairs transformed from knowledge tuples may be added into the knowledge QA pair set 716.

A learning-to-rank (LTR) model may be used for ranking candidate answers in the knowledge QA pair set 716 by giving a query of the user. In some implementations, latent semantic features may be adopted for comparing a query and a candidate <question, answer> pair in a dense vector space.

In an implementation, one query may be parsed into a dependency tree and the arcs may be used to find "knowledge tuples" from the tuple-style knowledge graph. Each candidate <question, answer> pair may correspond to a "knowledge tuple". The "dependency arc matching" score may be adopted in the LTR model. Both the query and a question or answer in each candidate <question, answer> pair may be performed dependency parsing, and then dependency arcs of the query and the question or answer may be compared to obtain a similarity score.

Figure 8C:
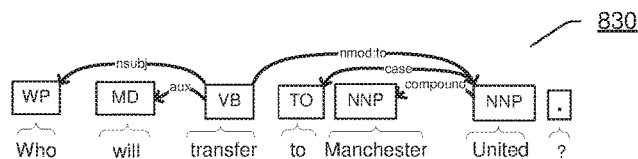

Given a query "Who will transfer to Manchester United?", FIG. 8C illustrates an exemplary dependency parsing 830 on this query according to an embodiment. Comparing the dependency tree 830 with the dependency tree 810, the same dependency arc pairs may be found, such as, "Manchester-compound-United", which is exactly the same word and arc matching. Moreover, similar dependency arcs are also shared between these two trees, such as, "transfer—nmod:to—Manchester United" and "Manchester United—nsubj—agree—dobj—transfer", which are implicit dense vector space matching. The comparison of dependency arcs may be performed in latent vector spaces, through projecting the dependency arcs into dense space vectors and then computing similarity scores of the two vectors by, such as, cosine function In an implementation, the LTR model may employ a gradient boosting decision tree (GBDT) algorithm for ranking candidate QA pairs for a query, and the following features may be utilized in the GBDT algorithm.

Implicit/explicit dependency arc similarity score between the dependency trees of the query and the candidate question.

Implicit/explicit dependency arc similarity score between the dependency trees of the query and the candidate answer.

Language model for information retrieval with respect to the query q and the candidate question Q: Given a query q and a candidate question Q, this feature measures the relevance between q and Q through:

$$P(q|Q) = \Pi_{w \in q}[(1-\lambda)P_{ml}(w|Q) + \lambda P_{ml}(w|C)] \qquad \text{Equation (2)}$$

where $P_{ml}(w|Q)$ is the maximum likelihood of word w estimated from Q. and $P_{ml}(w|C)$ is a smoothing item that is computed as the maximum likelihood estimation in a large-scale corpus C. Here the corpus C may be the knowledge QA pair set. The smoothing item avoids zero probability, which stems from those words appearing in the candidate question Q but not in the query q. The $\lambda$ is a parameter that acts as a trade-off between the likelihood and the smoothing item, where $\lambda \in (0, 1)$. This feature works well when there are a number of words overlapped between the query and the candidate question.

Language model for information retrieval with respect to the query q and the candidate answer A. In this language model, similarity score between the query and a candidate answer is also computed using Equation (1) by taking the candidate answer A instead of Q in Equation (1).

Translation-based language models with respect to the query q and the candidate question Q. This feature learns word-to-word and/or phrase-to-phrase translation probability from, such as, question-answer pairs, and incorporates the learned information into maximum likelihood.

Given the query q and the candidate question Q, translation-based language model is defined as:

$$P_{trb}(q|Q) = \Pi_{w \in q}[(1-\Delta)P_{mx}(w|Q) + \Delta P_{ml}(w|C)] \qquad \text{Equation (3)}$$

$$P_{mx}(w|Q) = \alpha P_{ml}(w|Q) + \beta P_{tr}(w|Q) \qquad \text{Equation (4)}$$

$$P_{tr}(w|Q) = \Sigma_{v \in Q} P_{tp}(w|v) P_{ml}(V|Q) \qquad \text{Equation (5)}$$

Here $\lambda$, $\alpha$ and $\beta$ are parameters satisfying $\lambda \in (0, 1)$ and $\alpha + \beta = 1$. $P_{tp}(w|v)$ is a translation probability from word v in Q to word w in q. Consequently, $P_{tr}(.)$ and $P_{mx}(.)$ and even $P_{trb}(.)$ are further similarity function constructed step-by-step by using $P_{tp}(.)$ and $P_{ml}(.)$ Translation-based language models with respect to the query q and the candidate answer A. In this language model, similarity score between the query and the candidate answer is also computed using Equations (3)-(5) by taking the candidate answer A instead of the Q in Equations (3)-(5).

Edit distance between the query and the candidate question in a word or character level.

Maximum subsequence ratio between the query and the candidate question.

Recurrent neural network (RNN) by using gated recurrent units (GRUs) as encoding. The encoding projects a sequence of words, a sequence of phrases, or a sequence of dependency arcs into a dense vector space, which is a latent semantic representation of the sequence. The query and the candidate question or answer may be provided to a RNN-GRU layer respectively to obtain corresponding dense vectors, and then similar score between the two dense vectors may be computed. The RNN-GRU layer may be bidirectional, which may be applied on sequences of "query" and "response" from left to right and/or from right to left. The definition of RNN-GRU is a special recurrent neural network building block that takes sequence x and previous state $h_t$ as inputs and predicts the next state of $h_{t+1}$, through a function $h_{t+1} = GRU(h_t, x_t)$. Here, GRU function is computed by using the following equations:

$$z_t = \sigma(W^{(z)}x_t + U^{(z)}h_{t-1} + b^{(z)}) \qquad \text{Equation (6)}$$

$$r_t = \sigma(W^{(r)}x_t + U^{(r)}h_{t-1} + b^{(r)}) \qquad \text{Equation (7)}$$

$$\tilde{h}_t = \tanh(Wx_t + r_t \circ Uh_{t-1} + b^{(h)}) \qquad \text{Equation (8)}$$

$$h_t = z_t \circ h_{t-1} + (1-z_t) \circ \tilde{h}_t \qquad \text{Equation (9)}$$

where $\circ$ is an element-wise product, $W^{(z)}$, $W^{(r)}$, W, $U^{(z)}$, $U^{(r)}$, U are weight matrixes by training, $W^{(z)}$, $W^{(r)}$, $W \in R^{n_H \times n_I}$, and $U^{(z)}$, $U^{(r)}$, $U \in R^{n_H \times n_H}$. Here, the dimensions $n_H$ and $n_I$ are hyper parameters. The above equations may also be abbreviated as:

$$h_t = GRU(x_t, h_{t-1}) \qquad \text{Equation (10)}$$

It should be appreciated that all the above features in the GBDT algorithm are exemplary, and more or less features may be adopted in the GBDT algorithm in various implementations.

Figure 9:
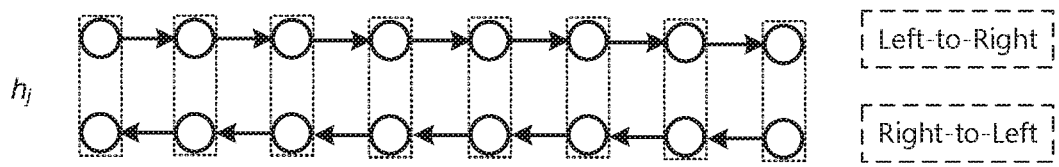
FIG. 9 illustrates an exemplary model for generating fact vectors according to an embodiment.

FIG. 9 illustrates an exemplary model 900 for fact encoding according to an embodiment. Fact vectors may be obtained through the fact encoding of the model 900. The fact vectors may be construed as fact information. In an implementation, the fact vectors may be generated by using a fact classifier through BiRNN.

As for context information obtained from a context database and/or a query from a user, texts in the context information and the query may be converted to numeric representations to be handled by a neural network. This can be achieved by representing each word in sentences of the texts as a continuous vector. The best representation for each word can be learned by the neural network.

A sentence may contain multiple pieces of information. Each single piece of information may be represented by a vector that is extracted using RNN. All such vectors extracted from texts in the context information may be collected into a "Context Matrix". Similarly, vectors extracted from texts in the query may be collected into a "Query Matrix".

The RNN may iterate word vectors in either direction or both, e.g., from left to right or from right to left, which is called BiRNN. When using BiRNN, the vectors computed by each direction may be concatenated into a new vector. A RNN cell may be, such as, Long-Short-Time-Memory (LSTM). Gated Recurrent Unit (GRU), etc. Hereinafter the process of GRU cells is described as an example.

The input is a sequence of sentences, where each sentence is ended with "</s>" to annotate the ending of one sentence. It is assumed that if all the sentences are connected, there will be T words, from $W_1$ to $W_T$. The input is encoded by using a bi-directional GRU encoder. For eight time steps in the left-to-right direction or the right-to-left direction, at each time step t, the model may update its hidden state $h_t = GRU(L[w_t], h_{t-1})$, where L is an embedding matrix and w, is a word index of the t-th word of the input sequence. Thus, the result representation vector for the input sequence at each "</s>" is a combination of two vectors and each vector is from one direction. The internal mechanics of the GRU is defined by Equations (6) to (9). Besides the encoding of word sequences, a positional encoding with bidirectional GRUs to represent "facts" of input sentences is also utilized. That is, $f_t = GRU_{12r}(L[S_t], f_{t-1}) + GRU_{r21}(L[S_t], f_{t-1})$, where $S_t$ is an embedding expression of the current sentence t, and $f_{t-1}$, $f_t$ are facts of a former sentence and the current sentence.

Figure 10:
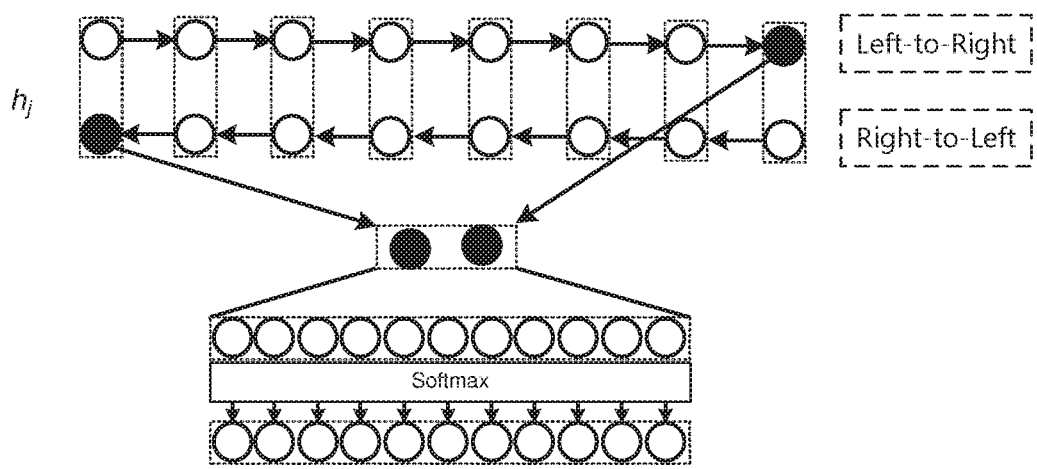
FIG. 10 illustrates an exemplary model for generating emotion vectors according to an embodiment.

FIG. 10 illustrates an exemplary model 1000 for emotion encoding according to an embodiment. Emotion vectors may be obtained through the emotion encoding of the model 1000. The emotion vectors may be construed as emotion information. In an implementation, the emotion vectors may be generated by using an emotion classifier through BiRNN together with a Softmax layer. The emotion classifier may be trained by applying a SoftMax layer on the last annotations of the left-to-right and/or right-to-left RNNs. A separate dataset may be used for training the emotion classifier.

Figure 11:
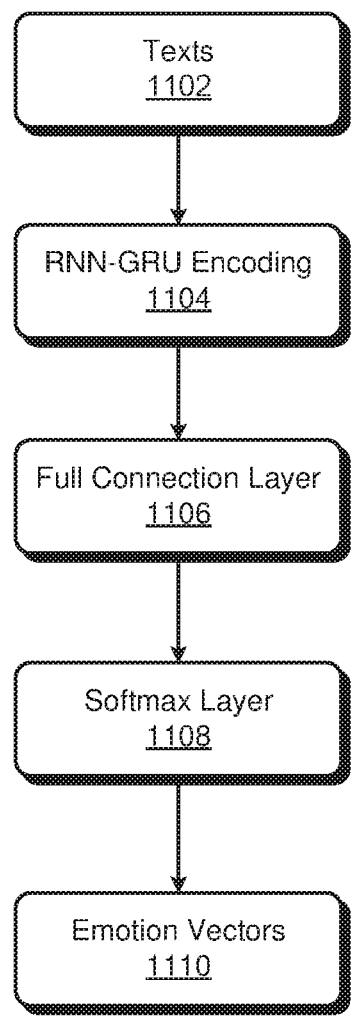
FIG. 11 illustrates an exemplary structure of an emotion classifier according to an embodiment.

FIG. 11 illustrates an exemplary structure of an emotion classifier 1100 according to an embodiment. The emotion classifier 1100 may be based on an emotion classification model which may adopt, such as, a recurrent neural network with gated recurrent unit (RNN-GRU). The internal mechanism of the GRU is defined by Equations (6) to (9).

When texts 1102 are inputted, RNN-GRU encoding may be applied on word embedding of the texts 1102 at 1104, wherein one or more layers of RNN-GRU may be gone through in a single direction or a bi-direction. e.g., from right to left and/or from left to right. The result from the RNN-GRU encoding may be feed to a full connection layer 1106 so as to perform vector connection. Then, a Softmax layer 1108 may be applied to output emotion vectors that indicate probabilities among several types of emotions. In an implementation, an emotion of an input text may be classified into one of 8 types of emotion, including anger, contempt, disgust, fear, happiness, neutral, sadness and surprise. For example, sentences such as "How dare you ignore that", "It is not interesting", etc. may be classified with the emotion "anger"; sentences such as "AI is despising me". "Only a computer cannot be that swagger", etc. may be classified with the emotion "contempt"; sentences such as "I do not care that I am disgusted by you". "You are more stupid than I expected", etc. may be classified with the emotion "disgust"; sentences such as "From now on, there is a scary TV program". "Say scary sentences 10 times", etc. may be classified with the emotion "fear"; sentences such as "I like you", "I believe that I am cute", etc. may be classified with the emotion "happiness"; sentences such as "Tomorrow's schedule is determined", "I want to know next week's weather of Tokyo", etc. may be classified with the emotion "neutral"; sentences such as "I do not like that and want to cry", "I am feeling sad", etc. may be classified with the emotion "sadness"; sentences such as "The typhoon brings so strong wind", "What?! Really?", etc. may be classified with the emotion "surprise". In an implementation, the above types of emotion may also be determined as a negative emotion or not. For example, any one of the anger, fear, contempt, sadness and disgust emotions may be determined as a negative emotion, while the happy emotion may be determined as a positive emotion, and the surprise and neutral emotions may be determined as neutral emotions. Alternatively, the surprise emotion may also be determined as a negative emotion.

It should be appreciated that although the above discussion shows 8 types of emotion or 3 types of emotion, the embodiments of the present disclosure are not limited to these types of emotion. Instead, emotion classifiers with any other number of emotion types may be also obtained and applied under the concept of the present disclosure. Further, although FIG. 11 illustrates that the emotion classifier takes texts as input, voices, images or videos may also be taken as input.

Moreover, it should be appreciated that, for a text, a fact vector obtained through FIG. 9 for the text and an emotion vector obtained through FIG. 10 for the text may also be concatenated together. The concatenated vector corresponding to the text may be provided to the reasoning model as discussed later.

Figure 12:
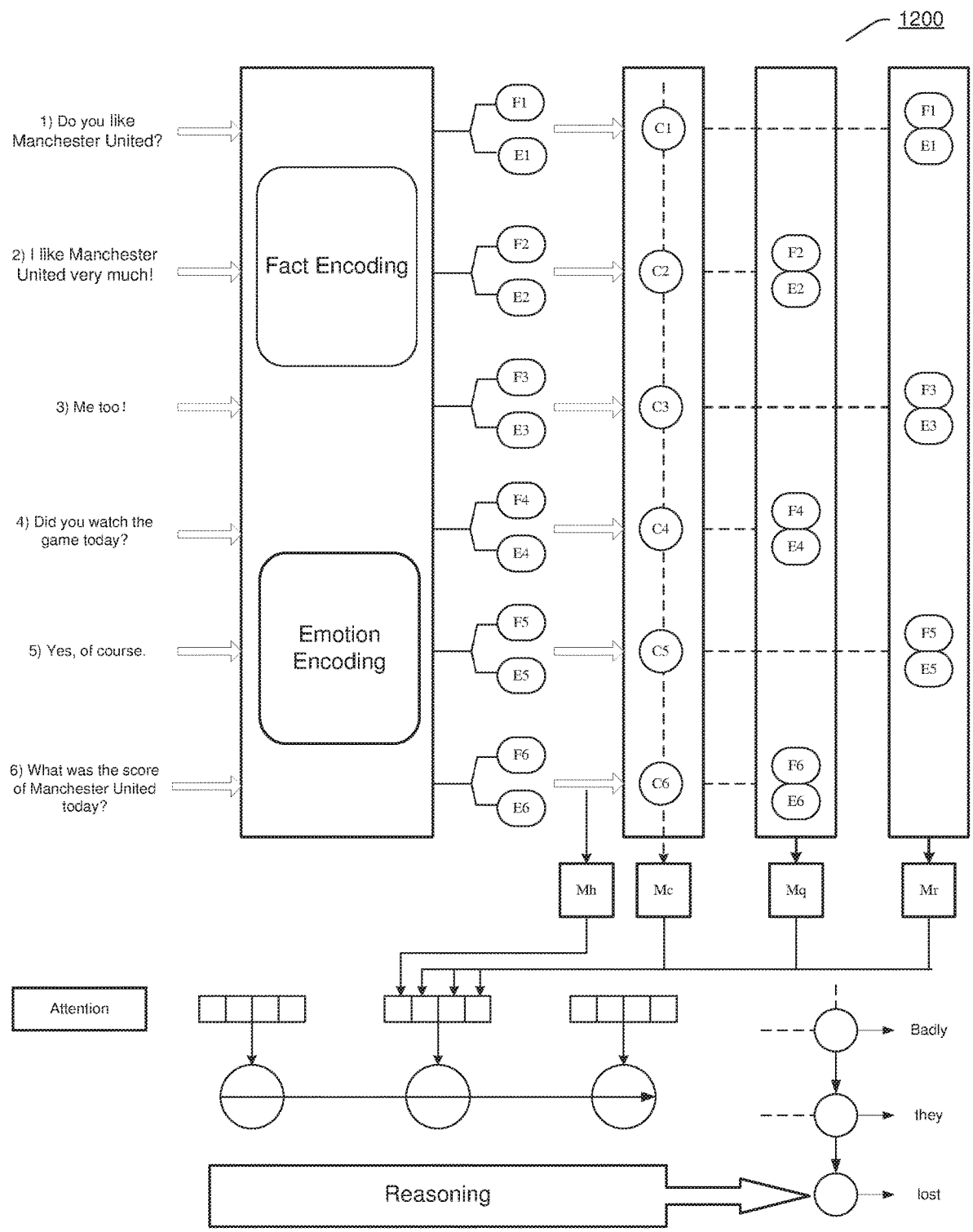
FIG. 12 illustrates architecture of an exemplary reasoning model according to an embodiment.

FIG. 12 illustrates architecture of an exemplary reasoning model 1200 according to an embodiment.

The reasoning model 1200 is configured for providing meaningful information to the queries of user while being empathic with the user's personalities, such as, the user's opinions or emotions towards topics, or even the user's gender, age, location, etc.

The reasoning model 1200 may provide a response to the current query/message from the user. The response needs to be grammatically correct and in the language used by the user. To produce natural sentences, a Language Model is trained. This language model may generate sentences by estimating one likely word at a time. Probability of a response may be obtained through integrating each word's probability using a Greedy Search or Beam Search algorithm.

The Language Model may be efficiently established based on Recurrent Neural Networks, such as GRU, because RNN can incorporate distance relations between words in a sentence. Sentences in the response should incorporate contextual information so as to be meaningful. This information may be incorporated through an attention mechanism that weights available information and integrates it into a single vector for each RNN step. Many text generation models use a shallow single-round attention mechanism which computes an attention vector as a weighted sum in a single operation. Intuitively, the conversation model is trained to approximate a function $p(y_t|y_{<t}, q, c)$, where $y_t$ denotes the next word to be output, $y_{<t}$ denotes previously outputted words, q denotes the query and c denotes the context. The context may be session log, documents indicated by the user or documents from partner entities.

As shown in the exemplary conversation in FIG. 12, there are six sentences 1) to 6), wherein the sentences 1), 3), 5) are responses by the chatbot, the sentences 2), 4), 6) are queries from the user, and the sentence 6) is the current query for which a response is to be generated. The six sentences are encoded independently by a BiRNN. Each sentence may be inputted into a fact encoding module and an emotion encoding module to generate a fact vector and an emotion vector respectively. For example, fact vectors and emotion vectors for sentences 1) to 6) are shown as (F1, E1), (F2, E2), (F3, E3), (F4, E4), (F5, E5), (F6, E6) respectively.

(F6, E6) is a vector pair for the current query, and the combination of F6 and E6 may form a current query memory vector or current query vector Mh. Each of the six vector pairs of (F, E) may be combined to form a vector. e.g., C1 to C6, and C1 to C6 may be iterated sequentially by a single-direction RNN to produce six context annotations in a context memory vector or context vector Me. Vector pairs of (F2, E2), (F4, E4) and (F6, E6) for sentences 2), 4), 6) may be combined respectively and may further form a query memory vector or query vector Mq. Vector pairs of (F1, E1), (F3, E3) and (F5, E5) for sentences 1), 3), 5) may be combined respectively and may further form a response memory vector or response vector Mr.

As discussed above, Mh denotes a memory for the current query. Mc denotes a memory for context information, Mq denotes a memory for all queries from the user, and Mr denotes a memory for all responses by the chatbot. Mh is a sentence-level memory, and Mr, Mq and Mc are session-level memories.

When the memories for the current query, the context information, the queries and the responses collect respective fact vectors and emotion vectors, an attention mechanism is applied based on these memories to generate attention vectors. In some cases, the attention mechanism sums different pieces of information weighted by their attributed relevance. In some cases, the attention mechanism is a multi-round reasoning attention. The multi-round reasoning comprises going through multiple reasoning "rounds" that infer new information that may be considered in the next-step reasoning round to reach a meaningful state.

The concatenation of the generated attention vectors may be used to update an RNN. An example of the reasoning RNN may be GRU. For each reasoning round, a "termination gate" estimates a probability for the reasoning to stop. When a value of, such as, "1" is reached by the termination gate, the reasoning mechanism stops and outputs its latest state. In some cases, the number of reasoning iterations may be a pre-defined number or be limited by a maximum number, and the outputs of the termination gate weight different states of the RNN which are summed to form the output vector of the reasoning mechanism. In some other cases, the number of reasoning iterations may be an arbitrary number.

Given a set of context vectors in Mc and a set of query vectors in Mq, the reasoning mechanism may generate a state vector $s_\tau$ that compresses the information. The state of the reasoning mechanism s may be initialized to an initial value $\theta_{initial}$, in which the step $\tau$ is set to one. The probability of termination state $t_\tau$ is initialized to zero, and $t_\tau=1$ means that the response is generated and reasoning is terminated.

The state $s_\tau$ may be computed through the following process.

The initial state is obtained as:

$$s_1 = \theta_{initial} \qquad \text{Equation (11)}$$

For each $M_u \in \{M_q, M_c, M_h, M_r\}$, where u is any one of q, c, h, r, one attention vector $c_u^{(\tau)}$ is computed as:

$$c_u^\tau = \sum_{k=1}^{|Mu|} \alpha_u^{(\tau,k)} h_u^{(k)}, \qquad \text{Equation (12)}$$

$$\alpha_u^{\tau,k} = \frac{\exp(e_u^{(\tau,k)})}{\sum_{j=1}^{n} \exp(e_u^{(\tau,j)})} \qquad \text{Equation (13)}$$

$$e_u^{\tau,k} = v_r^T \tanh(W_r s_{\tau-1} + U_r h_k). \qquad \text{Equation (14)}$$

where $W_r$ and $U_r$ are matrices, $s_{\tau-1}$ is the internal state for the decoding part, $h_k$ is the hidden state for the encoding part, v is a random vector in the model, e is an attention score, between $s_{\tau-1}$ and $h_k$.

When each attention vector $c_u^{(\tau)}$ is computed, the four attention vectors are concatenated into one vector:

$$c^{(\tau)} = [c_h^\tau, c_r^\tau, c_c^\tau, c_q^\tau] \qquad \text{Equation (15)}$$

By applying GRU as described in Equations (6)-(9), a new state $s_\tau$ may be computed as:

$$s_\tau = GRU(h_{t-1} = s_{\tau-1}, x = c_\tau, \theta_r) \qquad \text{Equation (16)}$$

where the parameters $\theta_r = \{W, U, b\}$ are specific to the reasoning mechanism.

The result state $s_\tau$ may be used for updating the termination probability as follows:

$$t_{\tau+1} = (1-t_\tau)\sigma(W_t s_\tau) \qquad \text{Equation (17)}$$

where σ is a sigmoid function.

If the termination probability t is above a threshold or τ is above a maximum iteration parameter $\tau_{max}$, then the reasoning process is terminated. Otherwise, τ is updated to τ+1 and the reasoning process is repeated from Equation (12).

When the reasoning process is terminated, a response may be generated based at least on the obtained latest state s. For example, in FIG. 12, the response may be generated as "Badly, they lost!", which is an emotional response to the user's current query "What was the score of Manchester United today?".

In another implementation, the memory for context information may be taken as a list of sentences in a plain text style document instead of a conversation as shown in FIG. 12, such as, a document indicated by the user, or a document from a partner entity. In such case, Mq and Mr may be omitted from the reasoning process, and fact vectors and emotion vectors for the context information may be generated based on sentences in the document.

Additionally or alternatively, a user profile may also be considered in the reasoning process. For example, a personalized knowledge graph in the user profile may indicate the user's emotions towards topics, and thus knowledge information in the personalized knowledge graph may be adopted by the reasoning process for providing an emotional response which considers the user's emotions towards the topic in the current session. For example, if the user is a fan of Manchester United, there is a high probability to generate a response "Badly, they lost!" with a sadness emotion when Manchester United loses the game. Moreover, gender, age and location information in the user profile may also be adopted by the reasoning process for providing an emotional response which is suitable for the user's gender, age and location information.

Figure 13:
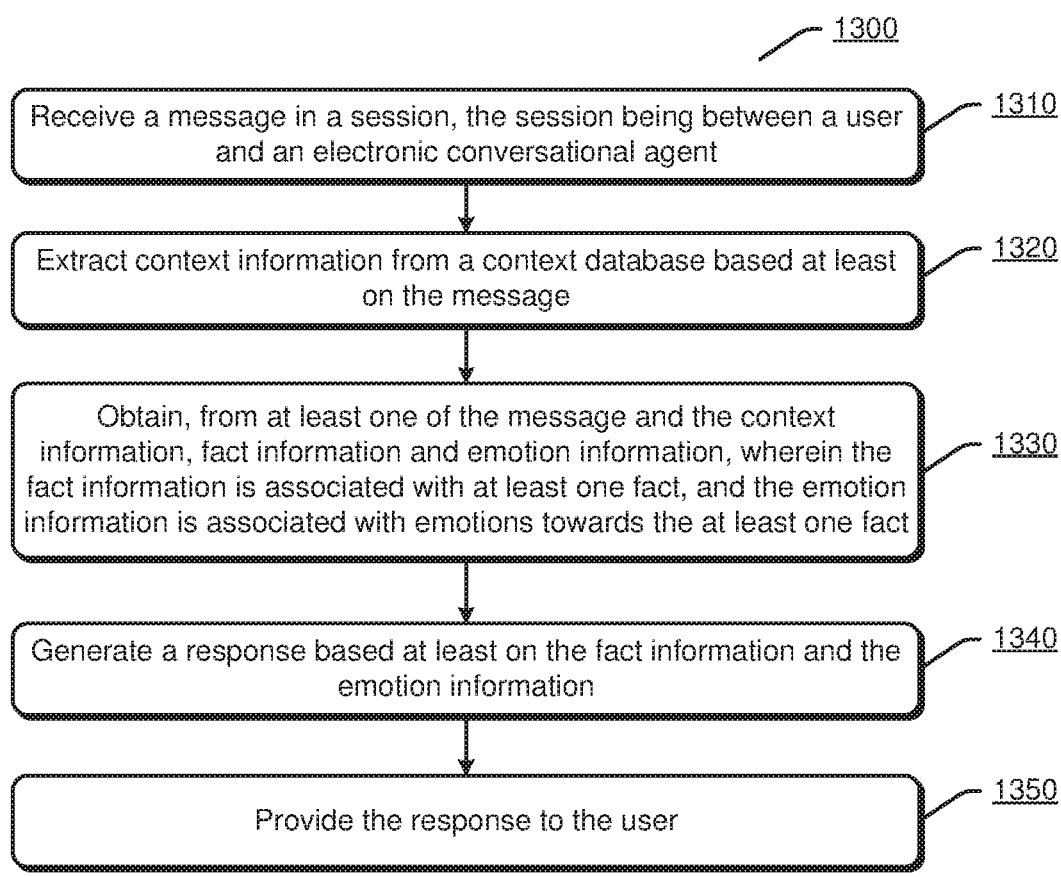
FIG. 13 illustrates a flowchart of an exemplary method for providing a response to a user in a question-answering session according to an embodiment.

FIG. 13 illustrates a flowchart of an exemplary method 1300 for providing a response to a user in a question-answering session according to an embodiment.

At 1310, a message may be received in a session. The session is between the user and an electronic conversational agent.

At 1320, context information may be extracted from a context database based at least on the message in a way as discussed above in connection with the operation at 510 in FIG. 5. The context information may comprise at least one of: session log, documents indicated by the user, and documents from partner entities.

At 1330, fact information and emotion information may be obtained from at least one of the message and the context information. In some cases, the fact information is associated with at least one fact and the emotion information is associated with emotions towards the at least one fact.

At 1340, a response may be generated based at least on the fact information and the emotion information.

At 1350, the generated response may be provided to the user.

In an implementation, the message may comprise at least one of text message, image message, voice message and video message.

In an implementation, the generating the response may be further based on user profile, the user profile including at least one of gender, age, location information, interested topics, and emotions towards the interested topics.

In an implementation, the at least one fact may comprise topic and/or keyword of the at least one of the message and the context information.

In an implementation, the emotions may comprise at least one of positive, negative, and neutral emotion.

The method may further comprise extending the message through the context information and/or general knowledge graph.

In an implementation, the extending the message may comprise: identifying the at least one fact from the message; retrieving, from the context information and/or the general knowledge graph, at least one extended fact associated with the at least one fact: and rewriting the message based on the at least one extended fact.

In an implementation, the fact information may comprise fact vector, the fact vector being obtained by utilizing a fact classifier.

In an implementation, the emotion information may comprise emotion vector, the emotion vector being obtained by utilizing an emotion classifier.

In an implementation, the generating the response may further comprise: performing multi-round reasoning with an attention vector, wherein the attention vector may be updated, in each round reasoning, through recalculating the fact information and the emotion information.

It should be appreciated that the method 1300 may further comprise any steps/processes for providing a response to a user in a question-answering session according to the embodiments of the present disclosure as mentioned above.

Figure 14:
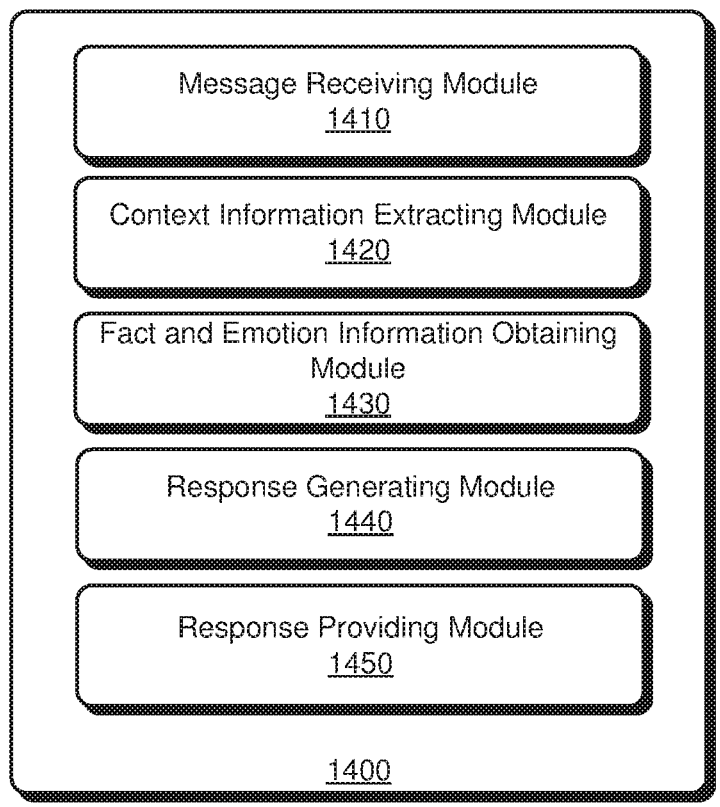
FIG. 14 illustrates an exemplary apparatus for providing a response to a user in a question-answering session according to an embodiment.

FIG. 14 illustrates an exemplary apparatus 1400 for providing a response to a user in a question-answering session according to an embodiment.

The apparatus 1400 may comprise: a message receiving module 1410, for receiving a message in the session, the session being between the user and an electronic conversational agent: a context information extracting module 1420, for extracting context information from a context database based at least on the message; a fact and emotion information obtaining module 1430, for obtaining, from at least one of the message and the context information, fact information and emotion information, wherein the fact information is associated with at least one fact, the emotion information is associated with emotions towards the at least one fact; a response generating module 1440, for generating a response based at least on the fact information and the emotion information: and a response providing module 1450, for providing the response to the user.

In an implementation, the context information may comprise at least one of: session log, documents indicated by the user, and documents from partner entities.

In an implementation, the response generating module 1440 may be further configured for any one or more of the following: generating the response based on user profile, the user profile including at least one of gender, age, location information, interested topics, and emotions towards the interested topics: and performing multi-round reasoning with an attention vector, the attention vector being updated, in each round reasoning, through recalculating the entity information and the emotion information.

In an implementation, the at least one fact may comprise topic and/or keyword of the at least one of the message and the context information.

The message receiving module 1410 may be further configured for extending the message through the context information and/or general knowledge graph. For example, the message receiving module 1410 may be configured for: identifying the at least one fact from the message; retrieving, from the context information and/or the general knowledge graph, at least one extended fact associated with the at least one fact: and rewriting the message based on the at least one extended fact.

In an implementation, the fact information may comprise fact vector, the fact vector being obtained by utilizing a fact classifier, and the emotion information may comprise emotion vector, the emotion vector being obtained by utilizing an emotion classifier.

Moreover, the apparatus 1400 may also comprise any other modules configured for providing a response to a user in a question-answering session according to the embodiments of the present disclosure as mentioned above.

Figure 15:
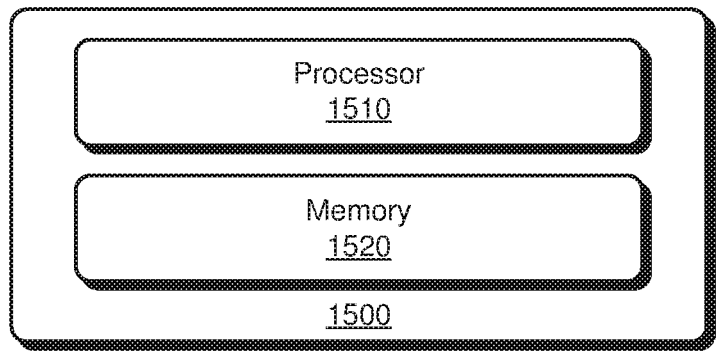
FIG. 15 illustrates an exemplary apparatus for providing a response to a user in a question-answering session according to an embodiment.

FIG. 15 illustrates an exemplary apparatus 1500 for providing a response to a user in a question-answering session according to an embodiment. The apparatus 1500 may comprise one or more processors 1510 and a memory 1520 storing computer-executable instructions. When executing the computer-executable instructions, the one or more processors 1510 may: receive a message in the session, the session being between the user and an electronic conversational agent; extract context information from a context database based at least on the message; obtain, from at least one of the message and the context information, fact information and emotion information, wherein the fact information is associated with at least one fact, and the emotion information is associated with emotions towards the at least one fact; generate a response based at least on the fact information and the emotion information; and provide the response to the user.

The embodiments of the present disclosure may be embodied in a non-transitory computer-readable medium. The non-transitory computer-readable medium may comprise instructions that, when executed, cause one or more processors to perform any operations of the methods for providing a response to a user in a question-answering session according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller. DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing a response to a user in a question-answering session, comprising:
   receiving a message in the session, the session being between the user and an electronic conversational agent;
   extracting context information from a context database based at least on the message;
   obtaining, from at least one of the message and the context information, fact information and emotion information, wherein the fact information is associated with at least one fact, and the emotion information is associated with emotions towards the at least one fact;
   generating a response based at least on the fact information and the emotion information, wherein the generating the response further comprises performing multi-round reasoning by inferring new information and then recalculating the fact information and the emotion information in each round of reasoning; and
   providing the response to the user.

2. The method of claim 1, wherein the message comprises at least one of text message, image message, voice message and video message.

3. The method of claim 1, wherein the context information comprises at least one of: session log, documents indicated by the user, and documents from partner entities.

4. The method of claim 1, wherein the generating the response is further based on user profile, the user profile including at least one of gender, age, location information, interested topics, and emotions towards the interested topics.

5. The method of claim 1, wherein the at least one fact comprises topic and/or keyword of the at least one of the message and the context information.

6. The method of claim 1, wherein the emotions comprise at least one of positive, negative, and neutral emotion.

7. The method of claim 1, further comprising: extending the message through the context information and/or general knowledge graph.

8. The method of claim 7, wherein the extending the message comprises:
   identifying the at least one fact from the message;
   retrieving, from the context information and/or the general knowledge graph, at least one extended fact associated with the at least one fact; and
   rewriting the message based on the at least one extended fact.

9. The method of claim 1, wherein the fact information comprises fact vector, the fact vector being obtained by utilizing a fact classifier.

10. The method of claim 1, wherein the emotion information comprises emotion vector, the emotion vector being obtained by utilizing an emotion classifier.

11. The method of claim 1,
    performing the multi-round reasoning includes performing the multi-round reasoning with an attention vector, the attention vector being updated, in each round reasoning, through recalculating the fact information and the emotion information.

12. An apparatus for providing a response to a user in a question-answering session, comprising:
    a message receiving module, for receiving a message in the session, the session being between the user and an electronic conversational agent;
    a context information extracting module, for extracting context information from a context database based at least on the message, wherein the context information comprises at least one of documents indicated by the user and documents from partner entities;
    a fact and emotion information obtaining module, for obtaining, from at least one of the message and the context information, fact information and emotion information, wherein the fact information is associated with at least one fact, and the emotion information is associated with emotions towards the at least one fact;

a response generating module, for generating a response based at least on the fact information and the emotion information; and a response providing module, for providing the response to the user.

13. The apparatus of claim 12, wherein the response generating module is further for generating the response based on user profile, the user profile including at least one of gender, age, location information, interested topics, and emotions towards the interested topics.

14. The apparatus of claim 12, wherein the at least one fact comprises topic and/or keyword of the at least one of the message and the context information.

15. The apparatus of claim 12, wherein the message receiving module is further for:

extending the message through the context information and/or general knowledge graph before extracting context information, wherein the extending the message comprises:

identifying the at least one fact from the message;

retrieving, from the context information and/or the general knowledge graph, at least one extended fact associated with the at least one fact; and rewriting the message based on the at least one extended fact such that context information is extracted based on the rewritten message.

16. The apparatus of claim 12, wherein the fact information comprises fact vector, the fact vector being obtained by utilizing a fact classifier, and the emotion information comprises emotion vector, the emotion vector being obtained by utilizing an emotion classifier.

17. The apparatus of claim 12, wherein the response generating module is further for:

performing multi-round reasoning with an attention vector, the attention vector being updated, in each round reasoning, through recalculating the fact information and the emotion information.

18. An apparatus for providing a response to a user in a question-answering session, comprising:

one or more processors; and a memory storing computer-executable instructions that, when executed, cause the one or more processors to:

receive a message in the session, the session being between the user and an electronic conversational agent;

extract context information from a context database based at least on the message;

obtain, from at least one of the message and the context information, fact information and emotion information, wherein the fact information is associated with at least one fact, and the emotion information is associated with emotions towards the at least one fact;

generate a response based at least on the fact information and the emotion information, wherein the response is generated by causing the one or more processors to perform multi-round reasoning by inferring new information and then recalculating the fact information and the emotion information in each round reasoning; and provide the response to the user.

* * * * *